United States Patent [19]
Yamazaki et al.

[11] Patent Number: 5,893,987
[45] Date of Patent: Apr. 13, 1999

[54] LASER OUTPUT CONTROL SYSTEM

[75] Inventors: Etsuo Yamazaki, Kitatsuru-gun; Nobuaki Iehisa, Mishima; Kazuhiro Suzuki, Minamitsuru-gun, all of Japan

[73] Assignee: Fanuc Ltd., Yamanashi, Japan

[21] Appl. No.: 08/374,755

[22] PCT Filed: Jun. 16, 1994

[86] PCT No.: PCT/JP96/00980

§ 371 Date: Feb. 7, 1995

§ 102(e) Date: Feb. 7, 1995

[87] PCT Pub. No.: WO95/01851

PCT Pub. Date: Jan. 19, 1995

[30] Foreign Application Priority Data

Jul. 5, 1993 [JP] Japan .................... 5-165437

[51] Int. Cl.[6] .................................. B23K 26/00
[52] U.S. Cl. ................... 219/121.61; 364/474.08
[58] Field of Search ...................... 219/121.6, 121.61, 219/121.62, 121.7, 121.71; 364/474.08

[56] References Cited

U.S. PATENT DOCUMENTS

| | | | |
|---|---|---|---|
| 4,326,473 | 4/1982 | Kigawa . | |
| 5,073,687 | 12/1991 | Inagawa et al. | 219/121.7 |
| 5,252,805 | 10/1993 | Nakata et al. | 219/121.61 |
| 5,434,383 | 7/1995 | Nakata et al. | 219/121.71 |
| 5,444,211 | 8/1995 | Nakata et al. | 219/121.61 |
| 5,453,594 | 9/1995 | Konecny | 219/121.61 |

FOREIGN PATENT DOCUMENTS

| | | |
|---|---|---|
| A-0 305 532 | 3/1989 | European Pat. Off. . |
| A-0 557 719 | 9/1993 | European Pat. Off. . |
| 62-104087 | 5/1987 | Japan . |
| 62-189780 | 8/1987 | Japan . |
| 62-197288 | 8/1987 | Japan . |
| 3-52781 | 3/1991 | Japan . |
| 3-126290 | 12/1991 | Japan . |

Primary Examiner—Geoffrey S. Evans
Attorney, Agent, or Firm—Staas & Halsey

[57] ABSTRACT

A laser output control system responsive to a command signal from a CNC, which is capable of sharply reducing time required for transfer of waveform data from the CNC in executing laser-beam machining. An output control device, upon receiving the command signal from the CNC, reads registration data and a set of waveform data stored in advance in one of the registers and a memory of an output control circuit, respectively, and then multiplies a peak value of a specified set of waveform data by a waveform scale factor and an override value set in advance to a PMC to form the waveform data into a waveform having a desired peak value. Then, by the use of a frequency and the number of times of output of the registration data, a repetition period and the number of repetitions of the set of waveform data are determined. The output control device delivers an output waveform thus determined to a power supply for a laser oscillator.

6 Claims, 6 Drawing Sheets

WAVEFORM DATA (1/2)

| STEP | WAVEFORM NO. 1 | NO. 2 | NO. 3 | NO. 4 | NO. 5 | NO. 6 | NO. 7 | NO. 8 |
|---|---|---|---|---|---|---|---|---|
| 1 | **** | **** | **** | **** | **** | **** | **** | **** |
| 2 | **** | **** | **** | **** | **** | **** | **** | **** |
| 3 | **** | **** | **** | **** | **** | **** | **** | **** |
| 4 | **** | **** | **** | **** | **** | **** | **** | **** |
| 5 | **** | **** | **** | **** | **** | **** | **** | **** |
| 6 | **** | **** | **** | **** | **** | **** | **** | **** |
| 7 | **** | **** | **** | **** | **** | **** | **** | **** |
| 8 | **** | **** | **** | **** | **** | **** | **** | **** |
| 9 | **** | **** | **** | **** | **** | **** | **** | **** |
| 10 | **** | **** | **** | **** | **** | **** | **** | **** |
| 11 | **** | **** | **** | **** | **** | **** | **** | **** |
| 12 | **** | **** | **** | **** | **** | **** | **** | **** |
| 13 | **** | **** | **** | **** | **** | **** | **** | **** |
| 14 | **** | **** | **** | **** | **** | **** | **** | **** |
| 15 | **** | **** | **** | **** | **** | **** | **** | **** |

| | | | | | | | | | WAVE-FORM NEXT PAGE | OPERA-TION |
|---|---|---|---|---|---|---|---|---|---|---|

WAVEFORM DATA (2/2)

| STEP | WAVEFORM NO. 1 | NO. 2 | NO. 3 | NO. 4 | NO. 5 | NO. 6 | NO. 7 | NO. 8 |
|---|---|---|---|---|---|---|---|---|
| 16 | **** | **** | **** | **** | **** | **** | **** | **** |
| 17 | **** | **** | **** | **** | **** | **** | **** | **** |
| 18 | **** | **** | **** | **** | **** | **** | **** | **** |
| 19 | **** | **** | **** | **** | **** | **** | **** | **** |
| 20 | **** | **** | **** | **** | **** | **** | **** | **** |

| | | | | | | | | | WAVE-FORM PREVIOUS PAGE | OPERA-TION |
|---|---|---|---|---|---|---|---|---|---|---|

FIG. 3

| COMMAND NO. | EXECUTION STEP | WAVE-FORM NO. | WAVE-FORM SCALE FACTOR | FRE-QUENCY | NUMBER OF TIMES OF OUTPUT |
|---|---|---|---|---|---|
| 1 | 1 | * | *** | *** | *** |
|   | 2 | * | *** | *** | *** |
|   | 3 | * | *** | *** | *** |
| 2 | 1 | * | *** | *** | *** |
|   | 2 | * | *** | *** | *** |
|   | 3 | * | *** | *** | *** |
| ⋮ | | | | | |
| 8 | 1 | * | *** | *** | *** |
|   | 2 | * | *** | *** | *** |
|   | 3 | * | *** | *** | *** |

FIG. 4

| DISPLAY OF EXECUTION STEPS | | REGISTER NUMBER | | | | | | | |
|---|---|---|---|---|---|---|---|---|---|
| ORDER | ITEM | NO. 1 | NO. 2 | NO. 3 | NO. 4 | NO. 5 | NO. 6 | NO. 7 | NO. 8 |
| 1 | WAVEFORM NO. | * | * | * | * | * | * | * | * |
|  | SCALE FACTOR | *** | *** | *** | *** | *** | *** | *** | *** |
|  | FREQUENCY | *** | *** | *** | *** | *** | *** | *** | *** |
|  | NO. OF TIMES OF OUTPUT | *** | *** | *** | *** | *** | *** | *** | *** |
| 2 | WAVEFORM NO. | * | * | * | * | * | * | * | * |
|  | SCALE FACTOR | *** | *** | *** | *** | *** | *** | *** | *** |
|  | FREQUENCY | *** | *** | *** | *** | *** | *** | *** | *** |
|  | NO. OF TIMES OF OUTPUT | *** | *** | *** | *** | *** | *** | *** | *** |
| 3 | WAVEFORM NO. | * | * | * | * | * | * | * | * |
|  | SCALE FACTOR | *** | *** | *** | *** | *** | *** | *** | *** |
|  | FREQUENCY | *** | *** | *** | *** | *** | *** | *** | *** |
|  | NO. OF TIMES OF OUTPUT | *** | *** | *** | *** | *** | *** | *** | *** |

× WAVEFORM SCALE FACTOR
× OVERRIDE VALUE

FIG. 6 (B)

FREQUENCY (OVERRIDE VALUE)
NUMBER OF TIMES OF OUTPUT

FIG. 6 (C)

T
TIME PERIOD CALCULATED
FROM FREQUENCY

NUMERICAL VALUE
SPECIFIED BY ADDRESS S

LASER OUTPUT CONTROL SYSTEM

BACKGROUND OF THE INVENTION

1. Field of the Invention

The present invention relates to a laser output control system for controlling a laser output in response to a command signal from a CNC.

2. Description of the Related Art

In drilling a hole using a CNC laser beam machine, a CNC transfers in advance waveform data, a repetition frequency and the number of times of output (hereinafter collectively referred to as "output data") necessary for executing hole drilling to an output control circuit (waveform control circuit), and then directs beam-on.

Therefore, when it is required to continuously carry out hole drilling under a plurality of machining conditions, the CNC repeatedly transfers the output data and directs beam-on, the same number of times as the number of the plurality of machining conditions in the manner described above.

By the way, in drilling one hole, it is required to carry out three consecutive steps of preliminary machining, main machining, and cleaning machining while changing machining conditions.

In such machining, the CNC transfers output data for preliminary machining and directs beam-on, then transfers output data for main machining and directs beam-on, and finally transfers output data for cleaning machining and directs beam-on. Thus, the transfer of data is carried out for each step of the machining, requiring, in the above example, as many as three times of data transfer in drilling a single hole. Therefore, in total, there is a waste of time amounting to the number of holes x three transfer time periods.

Summary of the Invention

The present invention has been made in view of the aforesaid problems, and an object thereof is to provide a laser output control system which is capable of sharply reducing a time period required in transfer of waveform data from a CNC during laser-beam machining.

To solve the above problems, the present invention provides a laser output control system responsive to a command signal from a CNC (Computer Numerical Controller), for executing control of laser output, comprising waveform data-storing control means for storing various sets of waveform data into a first memory region, registration data-storing control means for storing registration data including a specification for one of the sets of waveform data, into a second memory region, and output control means responsive to a command from the CNC, for reading the registration data within the second memory region, generating an output waveform, and delivering the output waveform to a power supply for a laser oscillator.

The waveform data-storing control means stores various waveform data transferred from the CNC into the first memory region. The registration data-storing control means stores the registration data transferred from the CNC into the second memory region. The output control means reads the registration data in response to a command from the CNC. The registration data include a specification for a set of the waveform data stored in the first memory region, and the output control means forms an output waveform based on the specified set of waveform data, and transfers the resulting output waveform to the power supply for the laser oscillator, thereby controlling the laser output.

DETAILED DESCRIPTION OF THE PREFERRED EMBODIMENTS

Next, an embodiment of the invention will be described with reference to the drawings.

Figure 1:
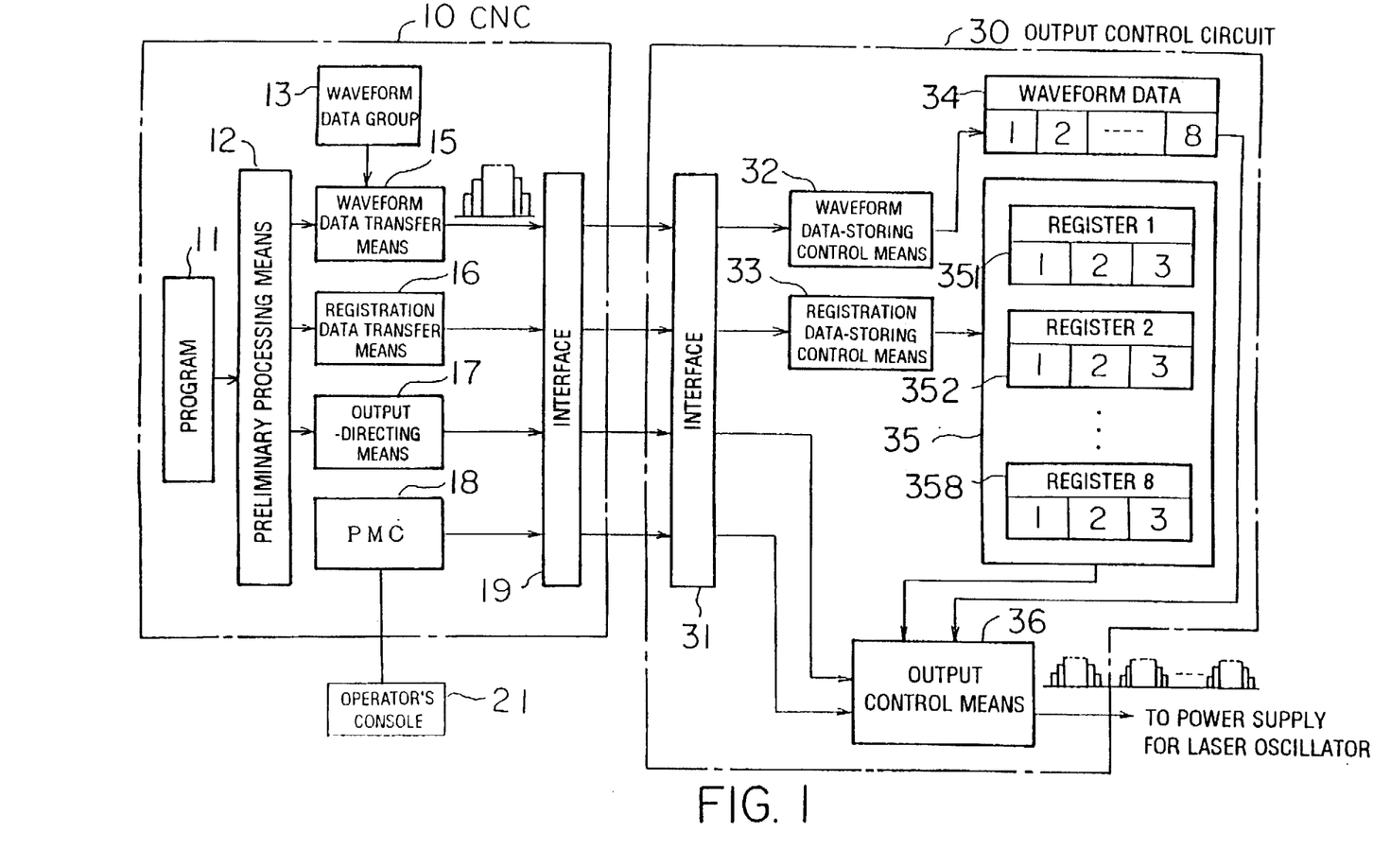
FIG. 1 is a block diagram showing the whole arrangement of a laser output control system according to the invention.

FIG. 1 is a block diagram showing the whole arrangement of a laser output control system according to the invention. In the figure, the laser output control system controls an output waveform of a laser oscillator of a laser beam machine (e.g. a pulse oscillation-type YAG laser beam machine), which is comprised of a CNC (Computer Numerical Controller) 10 and an output control circuit 30. The CNC 10 and the output control circuit 30 are each formed of a microprocessor.

The CNC 10 has preliminary processing means 12 for reading a program 11 and determining contents of commands from G codes, etc. thereof. Waveform data transfer means 15 transfers waveform data of a waveform data group stored beforehand in a memory 13 via an interface 19 to the output control circuit 30.

Figure 2:
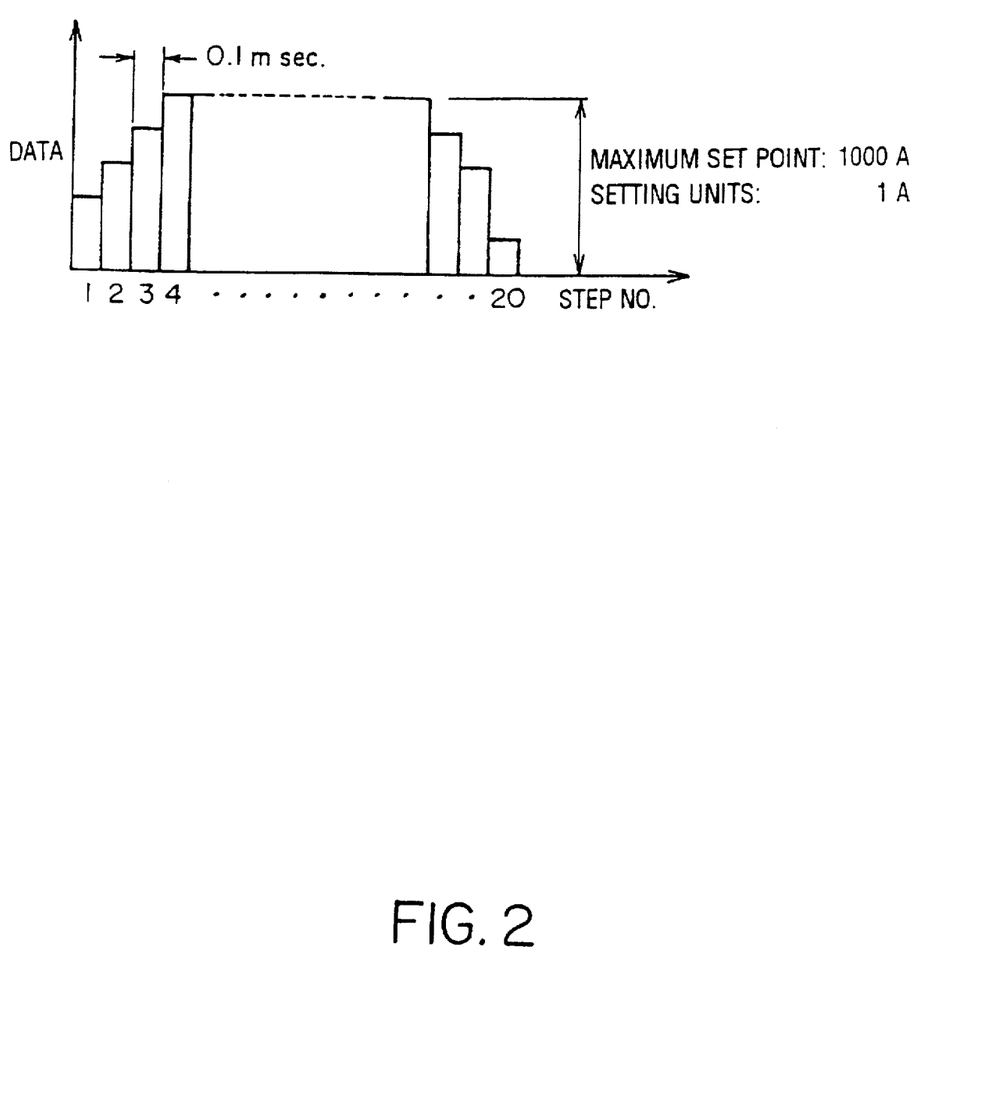
FIG. 2 is a diagram showing a set of waveform data.

The waveform data group is comprised of a plurality of (e.g. 8) sets of waveform data, each set being further formed of a plurality of (in the present example, 20) steps, as shown in FIG. 2. The waveform data are formed into the memory 13 by program commands each in the form of "G26P K I ;". Here, G26 is a code for directing the setting or transfer of waveform data, and numbers should be entered in respective blanks after addresses P, K, and I. A number to be set after the address P represents a waveform number (1 to 8) allotted to one of the sets of waveform data, a number to be set after the address K one of step numbers (1 to 20) allotted to respective steps, and a number to be set after the address K a peak value of each step. The peak value is in the form of an electric current command value directing a value of electric current which is set in setting units of 1 A and assumes a value of 1000 A at the maximum. Further, each step has a duration of 0.1 msec.

Figure 3:
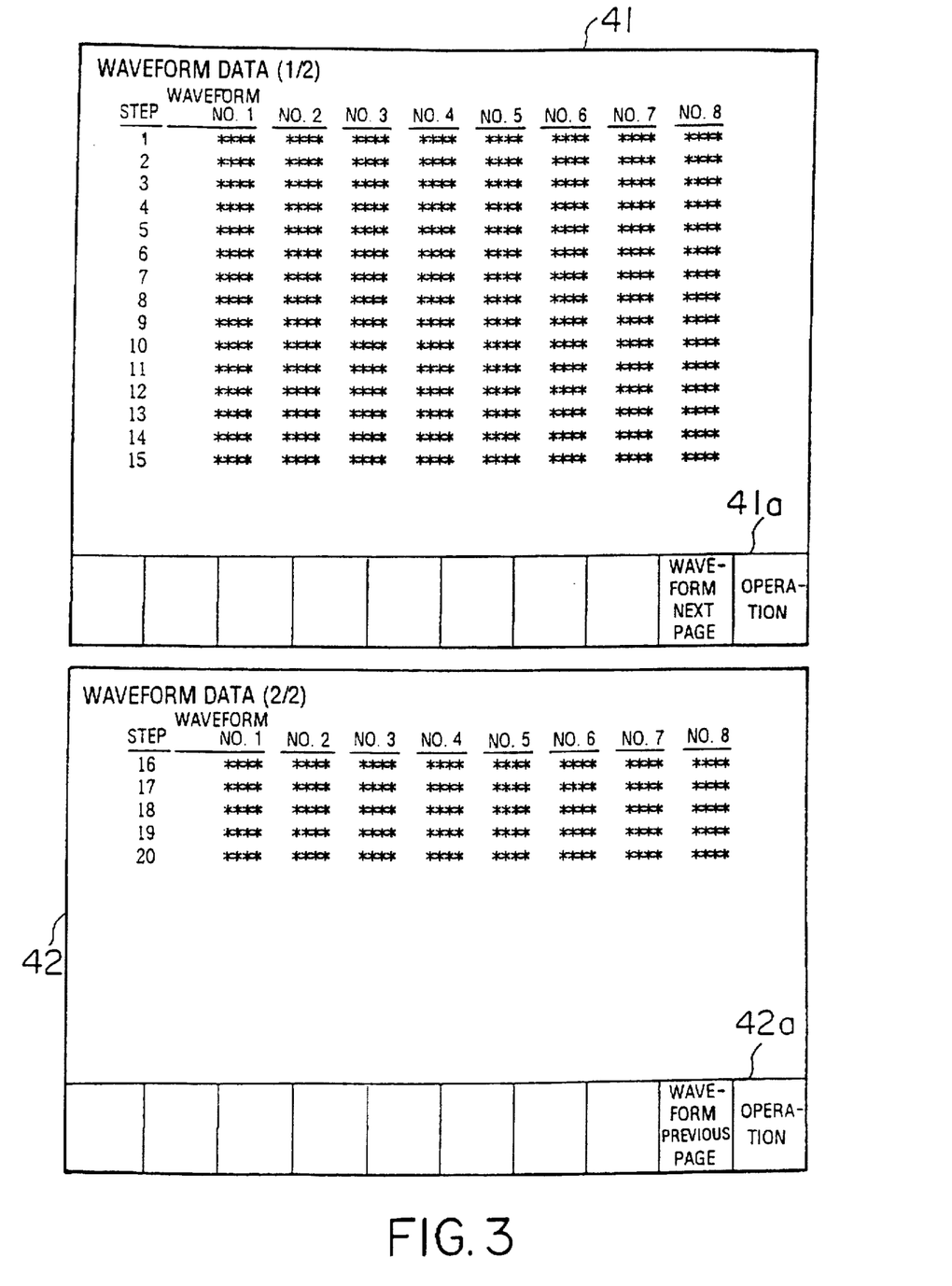
FIG. 3 is a diagram showing a waveform data group input by program commands, which is displayed on a screen.

FIG. 3 is a diagram showing the waveform data group displayed on a screen, which are input by the program commands described above. The eight sets of waveform data (Waveform No. 1 to No. 8) input by the program commands are displayed, as shown in the figure, on screens 41 and 42 of a CRT or the like. On the screen 41, there are displayed waveform data of Steps 1 to 15, and on the next screen 42, waveform data of Steps 16 to 20. Here, data of each step indicate a peak value (electric current command value) of the step. If one of operation keys 41a and 42a displayed as soft keys at bottom bars of the screens 41 42, respectively, is selected and clicked, it enables data to be modified on the screen, and the waveform data group having been modified is registered into the memory 13 to update the old data stored therein, through operation of a soft key, not shown, for registration.

The waveform data group thus input or registered is transferred, as described above, by the waveform data transfer means 15 appearing in FIG.1 to the output control circuit 30. This transfer is carried out by program commands in the form of "G26L50P;" for respective waveform numbers. Here, L50 is a transfer command, and a number to be set after the address P represents a waveform number. Waveform data corresponding to 20 steps of the waveform number are transferred to the output control circuit 30. Waveform datastoring control means 32 of the output control circuit 30 receives the waveform data for the 20 steps via an interface 31, and stores same into a memory 34 separately for each of the waveform numbers.

In FIG. 1, a register area 35 of the output control circuit 30 is provided with eight registers 351, 352, . . . 358. Each of the eight registers 351, 352, . . . 358 is further divided into three divisional areas each for storing therein registration data, described hereinbelow in detail. The three divisional areas of each register are provided e.g. for setting consecutive machining conditions (output waveforms) for the three steps of the preliminary machining, main machining, and cleaning machining to be carried out in drilling a single hole. A first divisional area (divisional area 1) stores registration data for executing the preliminary machining, a subsequent divisional area (divisional area 2) stores registration data for executing the main machining, and a final divisional area (divisional area 3) stores registration data for executing the cleaning machining.

Registration data transfer means 16 of the CNC 10 carries out transfer of registration data so as to register registration data in the divisional areas of the registers 351 to 358. The transfer of the registration data is carried out by program commands each in the form of "G25L J P K R S ;". Here, G25 is a code for directing the setting or transfer of registration data, and numbers should be entered in blanks after the addresses L, J, P, K, R, and S, respectively. A destination of the registration data is specified by the use of the addresses L and J, and the registration data are set by the use of the addresses P, K, R, and S. A number to be set after the address L represents one of register numbers (1 to 8) allotted to the registers 351 to 358, while a number to be set after the address J represents one of divisional area numbers (1 to 3) corresponding to execution steps, respectively, whereby registration data are stored into an area having the register number specified by the address L and the divisional area number specified by the address J. A number to be set after the address P represents one of the waveform numbers (1 to 8), a number to be set after the address K a waveform scale factor, a number to be set after the address R an output frequency, and a number to be set after the address S the number of times of output.

The waveform scale factor is a scale factor for multiplying a peak value of a set of the waveform data specified by the waveform number, and can be set, e.g. within a range of 30 to 100%, in setting units of 1%. The output frequency sets a repetition period of the set of the waveform data, and can be set, e.g. within a range of 1 to 200 Hz, in setting units of 1 Hz. Further, the number of times of output is the number of repetitions of the set of the waveform data, and can be set within a range of 0 to 999, in setting units of one time of output. If the number of times of output is set to −1, it means that the number of repetitions of the set of the waveform data is not particularly limited.

As described hereinabove, the registration data transfer means 16 transfers the registration data to the output control circuit 30 via the interface 19. Registration data-storing control means 33 of the output control circuit 30 receives the registration data via the interface 31, and stores same into a specified divisional area of one of the registers 351 to 358.

Figure 4:
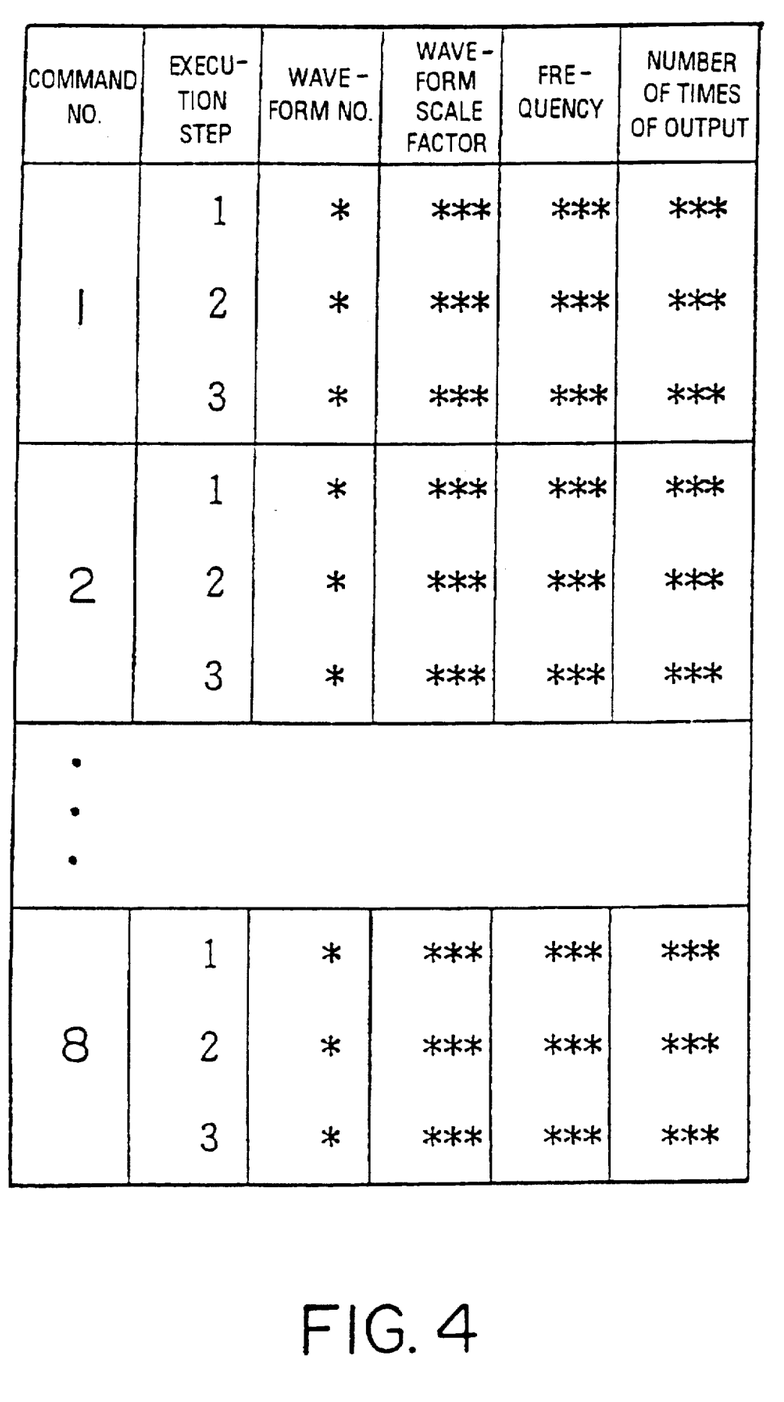
FIG. 4 is a diagram showing an arrangement of registration data stored in a register.

FIG. 4 shows an arrangement of registration data stored in the register. In the figure, COMMAND NO. represents a register number specified by L, and EXECUTION STEP represents a divisional area specified by J. For each divisional area, there are set registration data formed of a waveform number, a waveform scale factor, a frequency, and the number of times of output.

Figure 5:
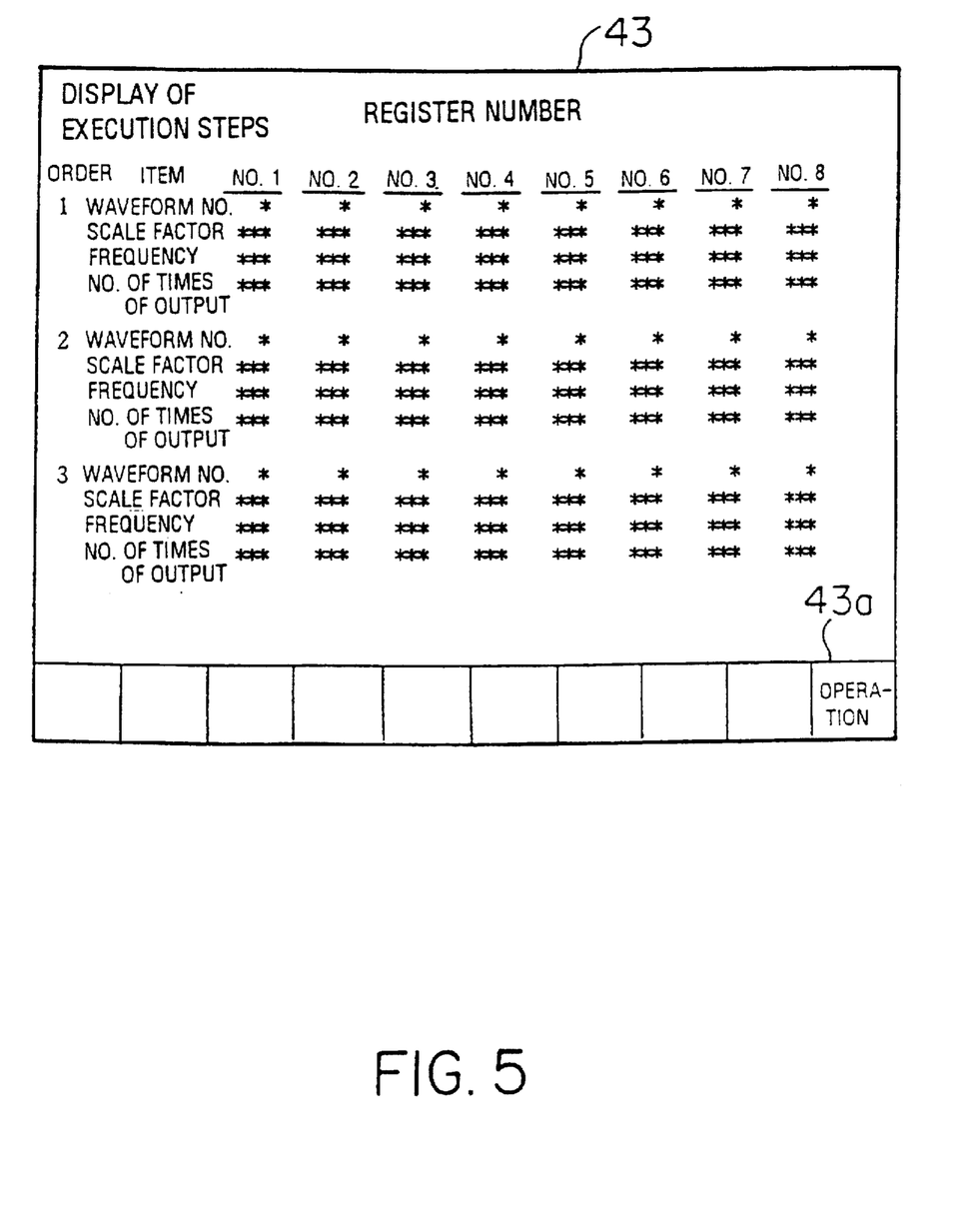
FIG. 5 is a diagram showing registration data displayed on a screen.

FIG. 5 shows the registration data displayed on a screen. The figure shows registration data input to the divisional areas of the registers 351 to 358, which are caused to be displayed on a screen by a program command. On the screen 43 of a CRT or the like, there are displayed data in each divisional area (execution step) of every register number, which specify a waveform number, a waveform scale factor, a frequency, and the number of times of output. When a soft key 43a is clicked for operation, it enables data to be modified on the screen, and registration data having been modified are stored into the registers 351 to 358 to update the old data therein, by clicking a soft key, not shown, for registration.

Referring back to FIG. 1, in response to a program command "G24L ;", output-directing means 17 of the CNC 10 transfers a beam on/off command and an output waveform-generating command to the output control circuit 30 via the interfaces 19 and 31. Here, G24 is a code for directing beam-on (outputting of a laser beam). Further, a number to be set in blank after L specifies a register number of a register storing data to be executed. The output control means 36 of the output control circuit 30, upon receiving a output command represented by the above command "G24L;", reads registration data stored in one of the registers 351 to 358 corresponding to the register number, and waveform data within the memory 34 specified by the waveform number as an item of the registration data. Further, the output control means 36 reads via the interfaces 19 and 31 override values input to a PMC 18 by the use of an operator's console 21. In this connection, the override values are classified into two kinds, one for a peak value (electric current command value) of a set of waveform data and one for a frequency. The output control means 36 executes control of the output waveform by the use of the above data thus read. A procedure of control of the output waveform executed then will be described with reference to FIG. 6.

Figure 6A:
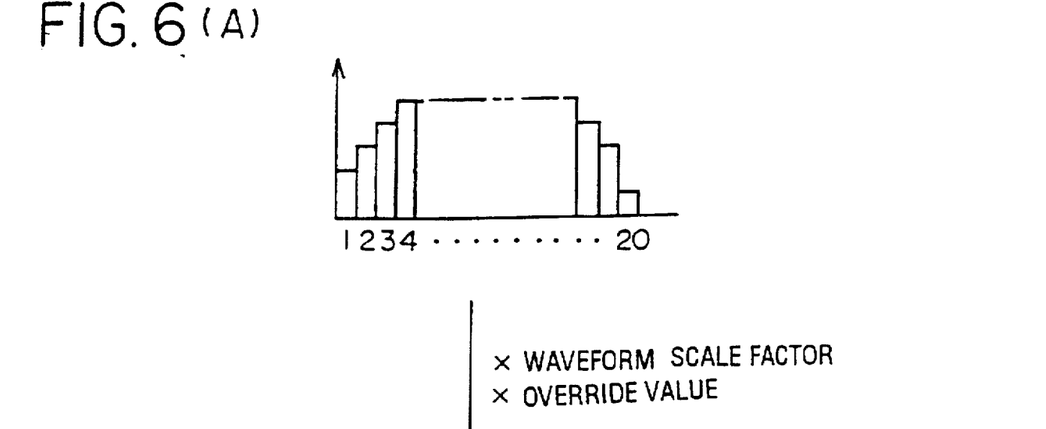
FIG. 6(A), FIG. 6(B), and FIG. 6(C) are explanatory diagrams illustrating output waveform control, in which FIG. 6 (A), FIG. 6 (B), and FIG. 6 (C) show a first stage, a second stage, and a third stage thereof, respectively.
Figure 6B:
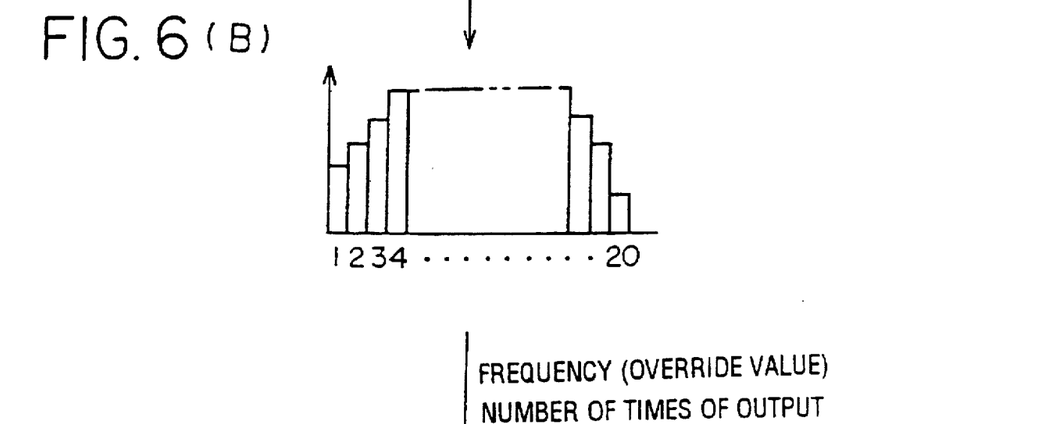
Figure 6C:
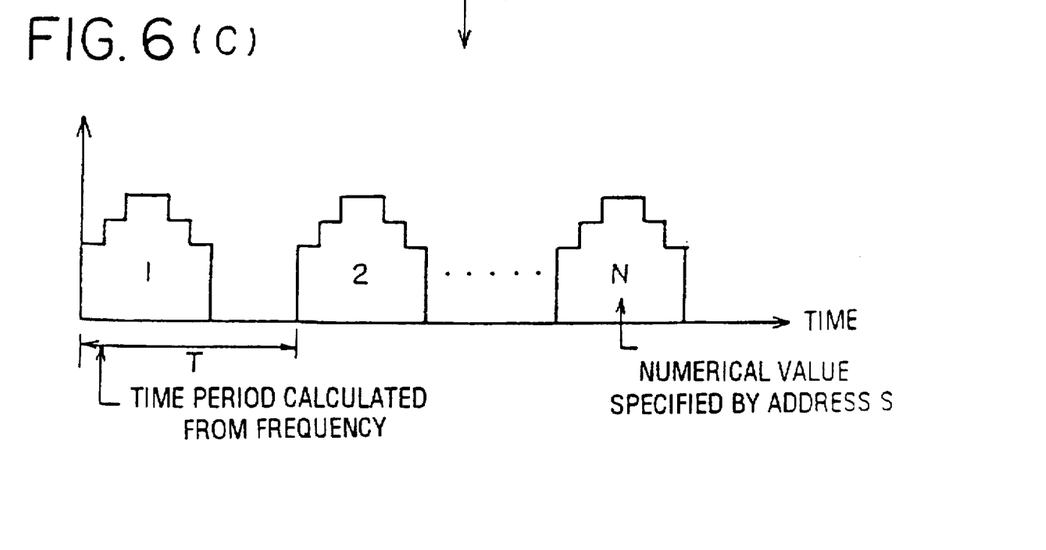

FIG. 6(A), FIG. 6(B) and FIG. 6(C) are explanatory diagrams for the output waveform control, in which there are shown a first stage, a second stage, and a third stage of the output waveform control, respectively. The output control means 36, upon receiving the output command from the CNC 10, first reads the registration data, the set of the waveform data, and the override values, as described above. Then, as shown in FIG. 6(A) and FIG. 6(B), the output control means 36 multiplies the peak value of the set of the waveform data by the waveform scale factor as an item of the registration data and the override value to form the waveform data into a waveform having a desired peak value. Then, as shown in FIG. 6 (C), a repetition period T and the number N of repetitions of the set of the waveform data are determined by the use of the frequency and the number of times of output of the registration data. The output control means 36 delivers the output waveform (shown in FIG. 6(C)) thus determined to the power supply for the laser oscillator (e.g. the YAG laser oscillator). In this connection, a value of the frequency described above assumes a value of the product of a frequency value in the registration data and an override value therefor, provided that the override value is set.

As described heretofore, according to the present embodiment, the output control circuit 30 stores waveform data and registration data in advance, and in carrying out laser-beam machining, the output waveform control is executed only in response to a beam-on command and a command for specifying registration data. Therefore, even with processing to be carried out while changing output waveforms, it is not required to send the waveform data from the CNC 10, thereby making it possible to continuously execute a series of laser-beam machining operations. Therefore, it is possible to sharply reduce time required for transfer of waveform data.

Further, since output waveforms are generated from a plurality of sets of waveform data as basis, by multiplying each set of waveform data by a waveform scale factor and an override value, it is possible to obtain a desired output waveform with ease.

Further, since an output command to be executed by the CNC is only required to direct beam-on and specify a register number, it is also easy to give the output command.

Although, in the above description, the present invention is applied to drilling of holes, this is not limitative but the present invention may be applied to other kinds of laser-beam machining, such as drilling. In such a case, the number of times of output can be set to −1 to release the limitation of the number of repetitions, thereby making it possible to prevent laser-beam output from being stopped in the course of drilling when the number of repetitions is reached.

As described heretofore, according to the present invention, the output control means adapted to operate in response to a command from the CNC stores waveform data and registration data therein in advance, and in carrying out laser-beam machining, the output waveform control is executed only by a command for directing beam-on and for specifying registration data. Therefore, even with processing to be carried out while changing output waveforms, it is not required to send the waveform data from the CNC, thereby making it possible to continuously execute a series of laser-beam drilling operations. Therefore, it is possible to sharply reduce time required for transfer of waveform data.

We claim:

1. A laser output control system responsive to a command signal from a CNC (Computer Numerical Control), for executing control of laser output, comprising:
   waveform data-storing control means for storing various sets of waveform data into a first memory region;
   registration data-storing control means for storing registration data including a specification for one of said sets of waveform data, into a second memory region; and
   output control means responsive to a command from said CNC, for reading said registration data stored in said second memory region, for generating an output waveform therefrom, and for delivering said output waveform to a power supply for a laser oscillator.

2. A laser output control system according to claim 1, wherein each of said sets of waveform data is formed of a plurality of steps each having a peak value set thereto.

3. A laser output control system according to claim 1, wherein said second memory region comprises a plurality of registers, each of said registers being divided into divisional areas for storing said registration data in a manner corresponding to an order of laser-beam machining executed following a plurality of steps.

4. A laser output control system according to claim 3, wherein said registration data-storing control means stores said registration data into one of said divisional areas of said register.

5. A laser output control system according to claim 1, wherein said registration data are formed as a set of a number specifying one of said sets of waveform data, a scale factor value for multiplying a peak value of one of said sets of waveform data thereby, a repetition frequency, and the number of times of output.

6. A laser output control system according to claim 5, wherein said output control means executes override of said peak value of said one of said sets of said waveform data and said repetition frequency by override signals transferred from a PMC (Programmable Machine Controller) within said CNC.

* * * * *

UNITED STATES PATENT AND TRADEMARK OFFICE
CERTIFICATE OF CORRECTION

PATENT NO.  : 5,893,987
DATED       : April 13, 1999
INVENTOR(S) : Yamazaki et al.

It is certified that error appears in the above-identified patent and that said Letters Patent is hereby corrected as shown below:

Title page

[86] "PCT/JP96/00980" should be --PCT/JP94/00980--.

Signed and Sealed this

Second Day of January, 2001

Attest:

Q. TODD DICKINSON

Attesting Officer

Commissioner of Patents and Trademarks